United States Patent [19]

Kudo

[11] 4,150,796
[45] Apr. 24, 1979

[54] APPARATUS FOR SHREDDING VEGETATION

[76] Inventor: Ben B. Kudo, 1523 Pebbledon St., Monterey Par, Calif. 91754

[21] Appl. No.: 567,986

[22] Filed: Apr. 14, 1975

[51] Int. Cl.² ............................................. B02C 18/22
[52] U.S. Cl. ............................ 241/101.1; 241/101.7; 241/222
[58] Field of Search ........... 241/27, 30, 101.1, 101.2, 241/101.7, 188 R, 189 R, 190, 222; 56/13.3, 13.4, 16.9, 17.5

[56] References Cited

U.S. PATENT DOCUMENTS

| | | | |
|---|---|---|---|
| 3,240,247 | 3/1966 | Lautzenheiser | 241/101.7 X |
| 3,286,376 | 11/1966 | Wildes | 56/16.9 X |
| 3,526,261 | 9/1970 | Ivey | 241/101.1 X |
| 3,527,278 | 9/1970 | Johnson | 241/101.2 X |
| 3,908,913 | 9/1975 | Cushman | 241/101.7 |

*Primary Examiner*—Howard N. Goldberg
*Attorney, Agent, or Firm*—Smyth, Pavitt, Siegemund, Jones & Martella

[57] ABSTRACT

A frame member having a vegetation-receiving chute with an outlet immediately adjacent the location at which the movable blade of a power lawnmower may be positioned in order to cup up and shred vegetation fed into the chute. In one embodiment, the chute may be located adjacent to the cutting blade of a reel-type lawnmower. In the second embodiment, the chute may be curved so as to bring the vegetation beneath a rotary-type mower. One edge of this latter chute may cooperate with a rotary blade for shredding the vegetation in a scissors-like action.

12 Claims, 11 Drawing Figures

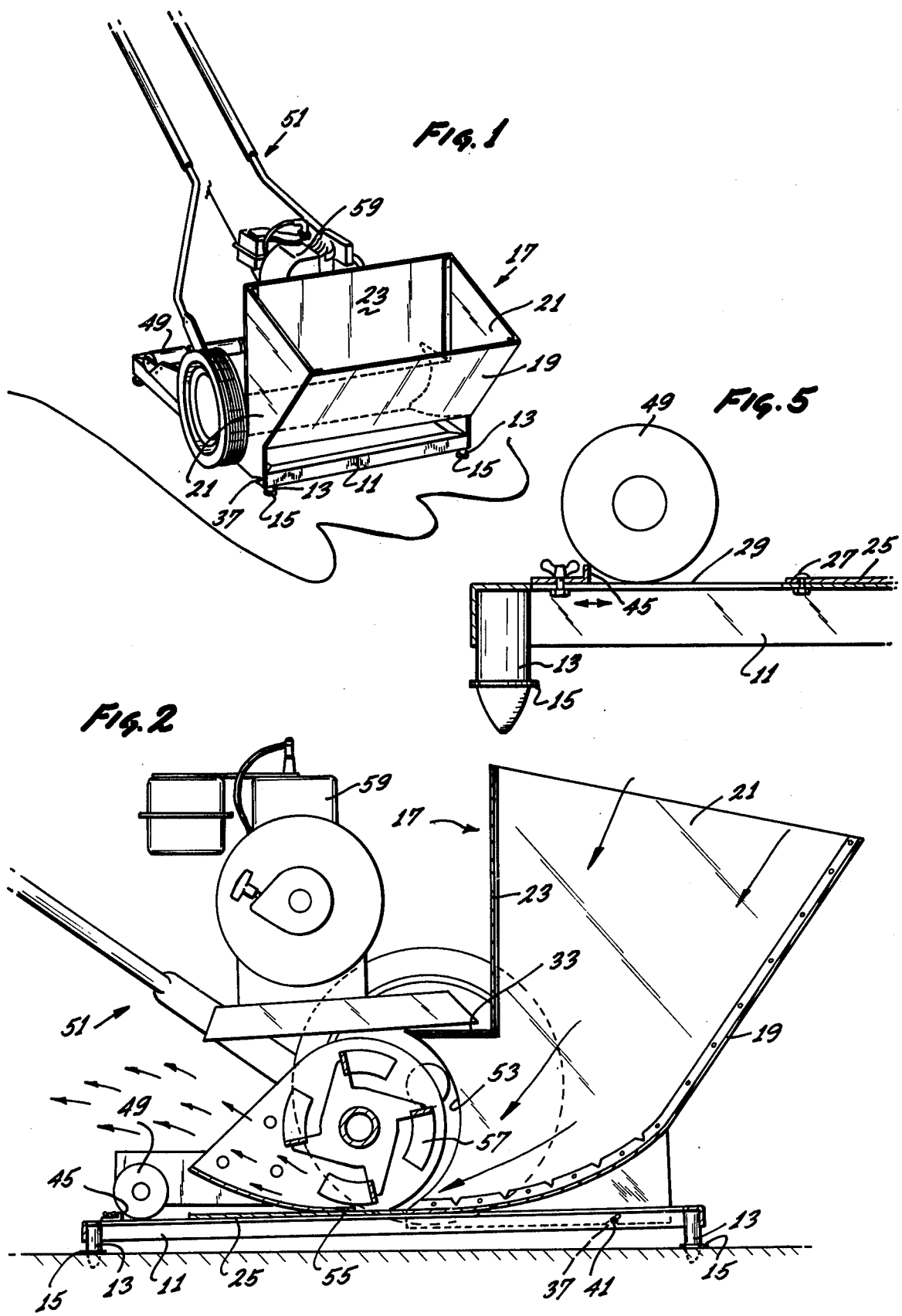

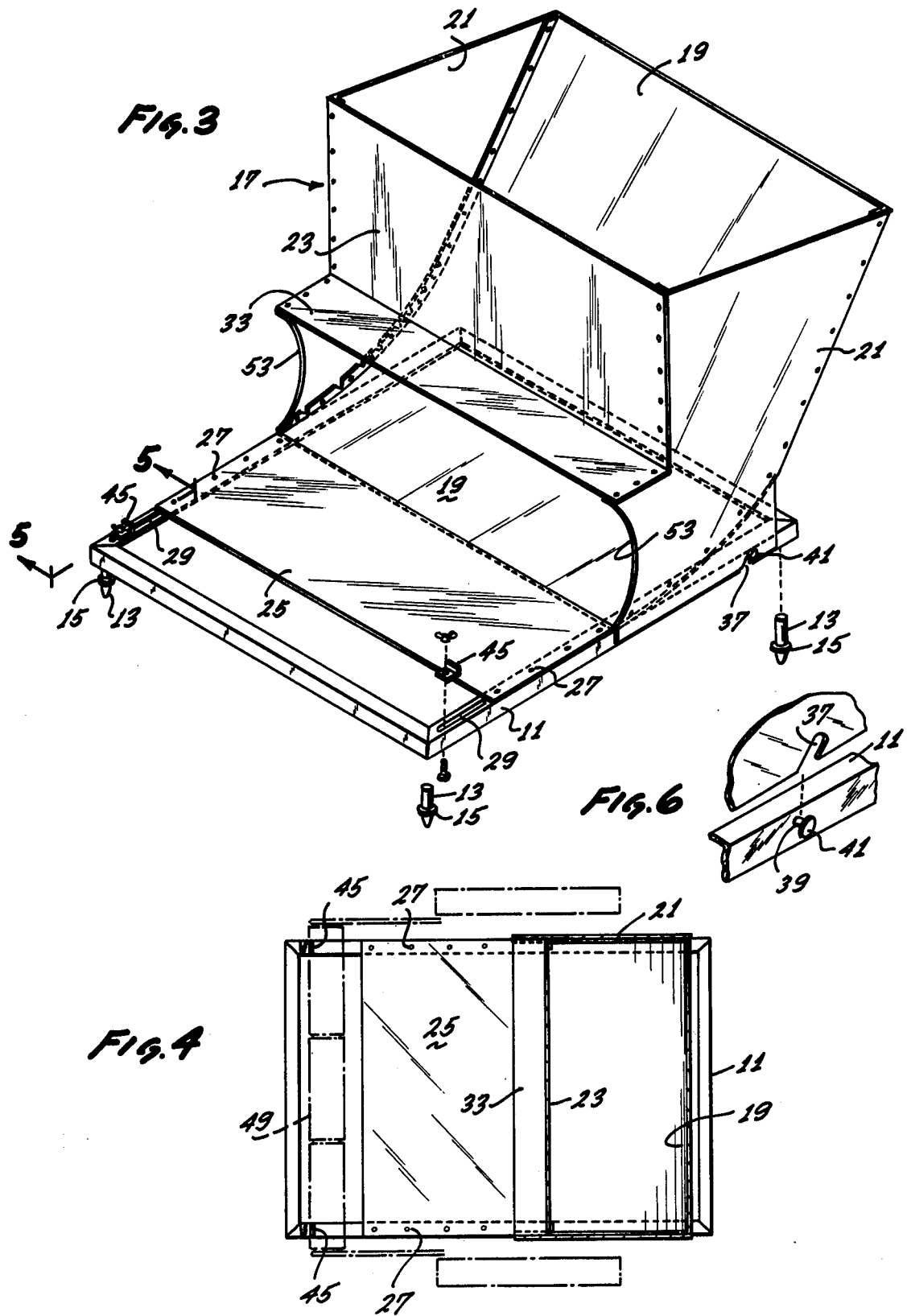

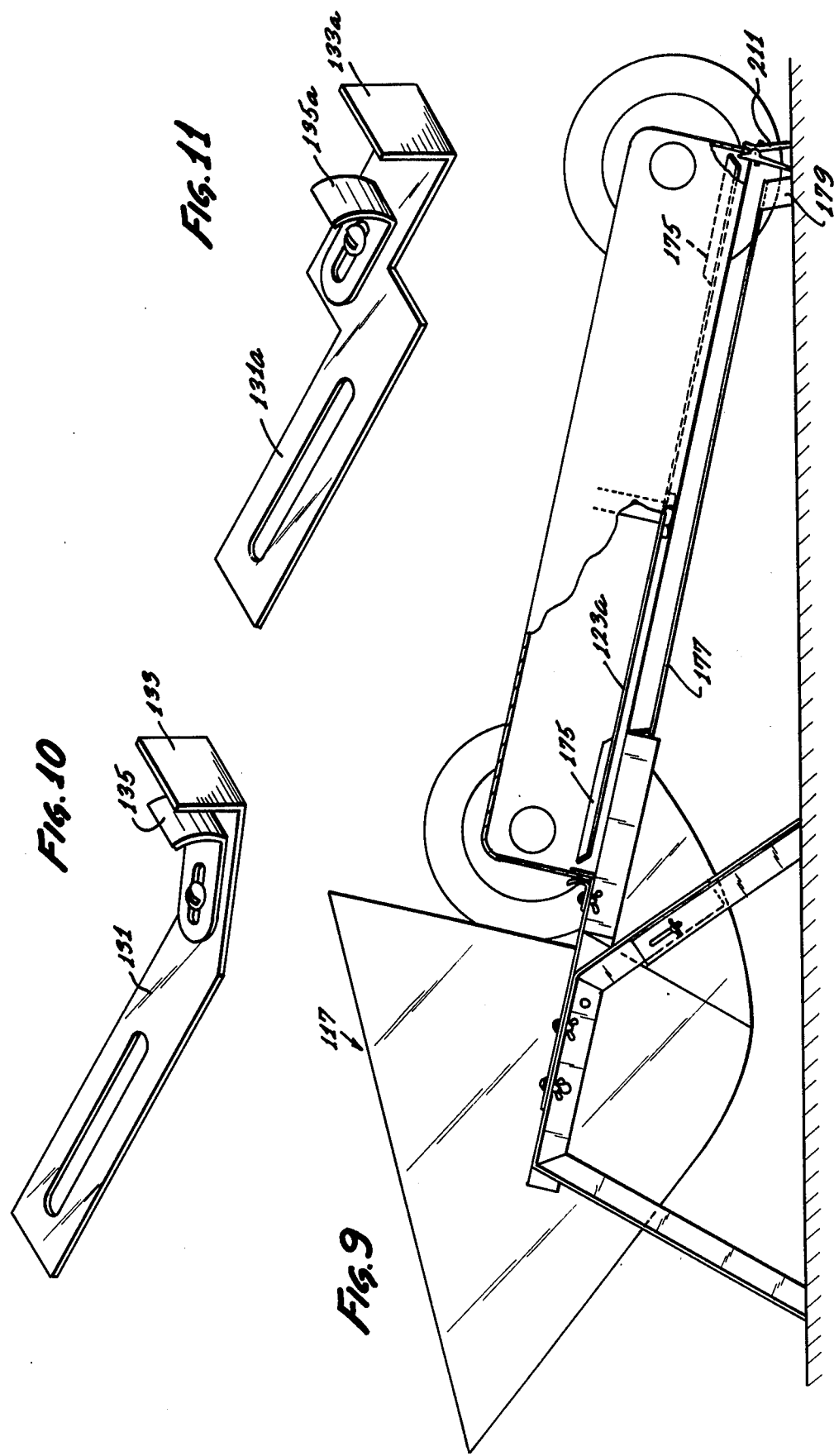

APPARATUS FOR SHREDDING VEGETATION

BACKGROUND OF THE INVENTION

Within the last decade, it has become clear to everyone that the old custom of burning leaves and other vegetation is undesirable due to the resulting air pollution as well as the loss of a valuable source of humus.

In all parts of the country, and particularly in those areas in which the majority of vegetation is not evergreen, restrictions against burning leaves and other vegetation have become burdensome in view of the fact that much of the vegetation, and especially large leaves, causes a difficult disposal problem due to the bulk of the waste.

In an attempt to at least partially overcome the disposal problem, shredding machines have been designed into which leaves and similar materials can be fed for shredding or comminution. Such machines have been shown, for example, in U.S. Pat. Nos. 3,240,247; 3,412,770; 3,716,198; and 3,726,488. All of these machines, when properly engineered, produce acceptable results for waste comminution and disposal. On the other hand, they really do not solve the problem since their use is generally limited to large commercial operations such as parks, golf courses, etc. This is because each of the prior art devices comprises a complete machine which includes its own engine, cutting apparatus, chute, etc.

Consequently, transporting the heavy prior art machines is difficult, large storage spaces are required, and an economic investment which usually is unwarranted and impractical in the case of the individual homeowner is required. Further, all of these machines require maintenance for both the engine and the other parts. As a result, small gardening services and individual homeowners still have no realistic way to dispose of their leaves and other vegetation refuse. In many cases, refuse bulk is so great that the expense of procuring plastic bags or other containers for disposal is prohibitive, resulting in illegal burning, with resultant air pollution, and/or illegal dumping on others' property, with obvious undesirable consequences.

SUMMARY OF THE INVENTION

Accordingly, to solve the problem of vegetation waste disposal, it is necessary to have a device which will shred or comminute the vegetation at a rate sufficiently rapid as to be useful and effective without requiring a large expenditure to procure the device and use it. Preferably, the device should require very little storage space and should be maintenance free.

In accordance with these requirements, the present invention relates to a device which can be used to shred or comminute leaves, vegetation, and similar materials when employed with a machine which many homeowners and most landscape maintenance services already possess: a power lawnmower. Since such lanwmowers already employ electrical or gasoline drive motors, those using the invention need not acquire a second engine needing its own maintenance, in addition to the maintenance already required for their lawnmowers, Also, this invention obviates the need for another piece of heavy equipment which would have to be moved around and stored.

In accordance with the present invention, a relatively small, lightweight structure is provided upon which a power lanwmower, already owned by the user, may be mounted so that the vegetation to be shredded can be fed directly to the lawnmower cutting blade by a chute which is either integral with or fastened to the lower support structure. Ideally, the support structure would be adjustable so as to accept a wide variety of mower sizes. Consequently, a large number of different sizes and shapes of devices formed in accordance with the invention would not need to be maintained in an inventory. In each, a chute may be conveniently located to receive vegetation while prohibiting the user from putting his hands near the mower blades.

Although a device formed in accordance with the present invention might assume any suitable design configuration, it will be realized that there are two basic types of power lawnmowers presently available—the rotary and the reel. While it is possible to design a single device which could accommodate both types of mowers, for the purposes of this application different structures will be described so as to clearly illustrate that the invention can be embodied in a variety of forms. It is cautioned, however, that the invention, in both apparatus and method, is only limited by the scope of the appended claims and not to either or both of the described embodiments.

BRIEF DESCRIPTION OF THE DRAWINGS

FIG. 1 comprises a perspective illustration of a first embodiment of the device which may be utilized with a reel-type lawnmower, as seen from the front thereof;

FIG. 2 comprises a side elevation of the device shown in FIG. 1, partly in section, to more accurately reveal the details thereof;

FIG. 3 comprises a perspective illustration of the device shown in FIG. 1, partly in exploded view, as seen from the rear thereof;

FIG. 4 comprises a top plan view of the device illustrated in FIGS. 1-3;

FIG. 5 comprises a view partly in section and partly in elevation taken along the line No. 5—5 of FIG. 3 showing the structure which may be provided to locate and support a lawnmower;

FIG. 6 comprises a partial view of a fastening means which may be employed with the illustrated device so as to removably fasten portions thereof to one another;

FIG. 9 comprises a side elevation of a third embodiment of the invention, which may be utilized with a rotary mower of the vacuum type; and FIGS. 10 and 11 comprise perspective views of alternative devices which might be used to position a lawnmower relative to an apparatus employing the invention.

DETAILED DESCRIPTION

Figure 7:
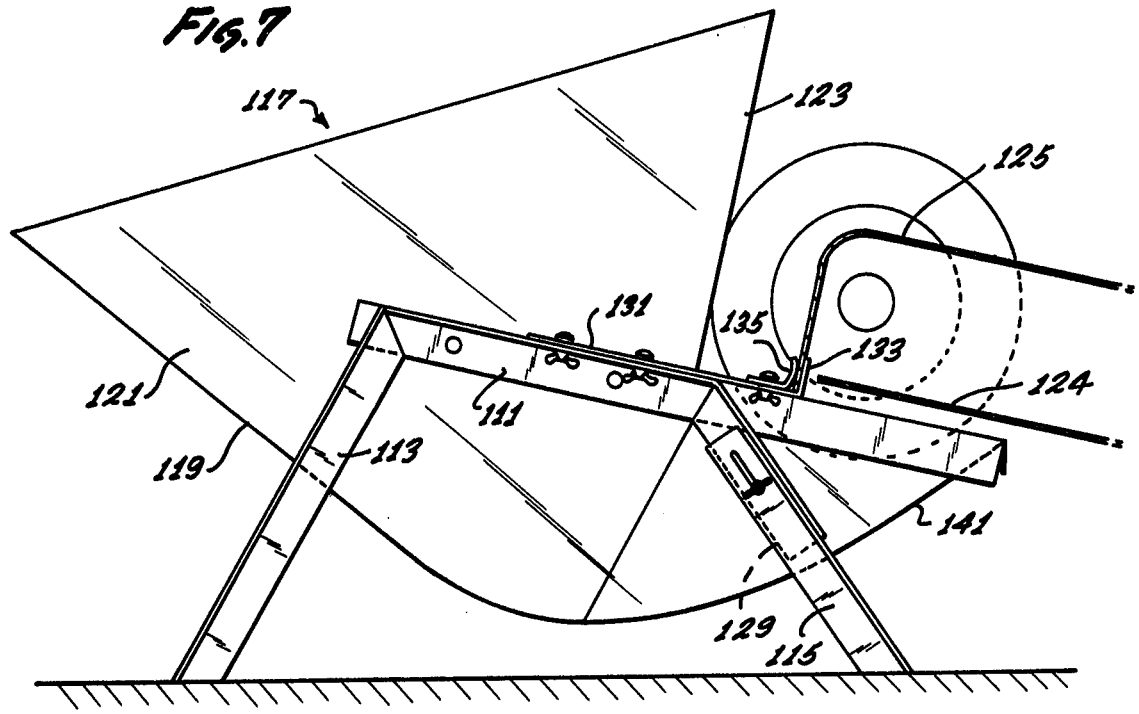
FIG. 7 comprises a side elevation of a second embodiment of a device, formed in accordance with the present invention, which may be utilized with a rotary lawnmower.

Referring now to FIGS. 1-4, there is shown a base or frame member 11 which may be suitably supported by means such as pins 13. The pins may be provided with suitable shoulder devices 15 to prevent the frame from sinking into the ground.

At the forward portion of the frame, a chute, generally designated 17, may be suitably mounted. The chute may be either fixed temporarily or permanently to the frame or may be an integral portion thereof, if desired.

As illustrated, the chute comprises a front wall 19, a pair of side walls 21, and a rear wall 23. As can be seen particularly with reference to FIGS. 2 and 3, the lower portion of the front wall 19 may be curved so as to terminate along a line in abutment with a flat plate 25. The plate may be suitably fastened to the frame 11, for example by bolts 27 so as to allow the position of the plate to be adjustable by moving the bolts along slots 29 on the edges of the frame. Thus, the front plate 19 of the chute 17 and the plate 25 on the frame 11 will cooperate to provide a continuous surface along which vegetation can move without being able to fall to the ground.

The rear plate 23 of the chute 17 may terminate in a rearwardly directed extension 33 which may be fastened to the upper portions of the rearmost sections of the side plates 21. In other words, the extension 33 may be substantially parallel to the plate 25 and the very bottom portion of the chute front plate 19. Thus, as seen in FIG. 2, when vegetation is inserted into the upper portion of the chute in the direction illustrated by the arrows, its direction of travel will be changed nearly, or substantially, 90°, i.e., from downward movement to rearward movement, as a result of the chute configuration.

If it is desired to mount the chute 17 on the frame in a temporary fashion, a suitable quick-release fastening structure may be provided. For example, a slot 37 in the lower portion of each chute side 21 may cooperate with a pair of rods 39, having heads 41 on the outer ends thereof, to prevent movement of the chute once the slots have been placed over the rods. Thus, the chute can be removed and cleaned.

Near the rear of the frame 11, a pair of stops 45 may be positioned within the slots 29 and releasably fixed at any desired location within each slot for cooperation with the cutting height adjustment roller 49 on a reel-type lawnmower 51.

In use, the frame and chute may be attached to one another and suitably located at the work site. The gardener may then place the lawnmower 51 on the frame 11 so that the height adjustment roller 49 is located in abutment with the stops 45, as shown, allowing the front portion of the mower to fit closely against the chute. For this reason, if desired, the rearward portions of the side plates 21 may be curved, as at 53, to allow the close cooperation. In this manner the mower's fixed cutting blade 55 and the reel-type moving blades 57 may be closely located adjacent to the exhaust or outlet end of the chute so that all of the vegetation or organic material which is passed through the chute can be shredded by the blades. The operator may then start the engine 59 of the lawnmower 51 and, if necessary, engage a suitable clutch or other device so that the moveable blades 57 will rotate about the reel axis. Then, the vegetation can be fed into the inlet end of the chute toward the mower and the shredding operation begun. If desired a suitable grass catcher or other device (not shown) may be mounted on the mower or a suitable bagging device may be located at the rear of the frame so that all of the shredded material is discharged directly into a disposal bag.

Also, if desired, with respect to this embodiment as well as the embodiments described below, structure may be provided to allow the chute to be adjusted so that the inlet end can be raised and lowered. This, of course, would allow the organic material either to be picked up and placed into the chute or to be swept or raked into the chute in the lowered position.

With respect to all of these embodiments, it will be noted that the chute is preferably designed so that the wheels on either side of the lawnmower will be located off the edges of the frame. In this manner, if the operation of the lawnmower engine 59 serves to drive the wheels whenever the blade—whether reel or rotary—is turned, the wheels will spin free without affecting the operation of the device in shredding vegetation. Further, suitable configuration of the chute and the frame will allow the lawnmower to be substantially centrally located on the frame so that the operator can start the lawnmower in the normal manner without danger of causing the frame to tilt or to allow the lawnmower to fall off its upper surface.

Thus, with this structure, a one or two-section device which can be produced from relatively lightweight and readily available materials can be employed in combination with a lawnmower to shred and comminute leaves, etc., to facilitate the disposal thereof, while obviating the need to purchase a separate and distinct engine driven machine with the problems inherent therein as described previously.

Figure 8:
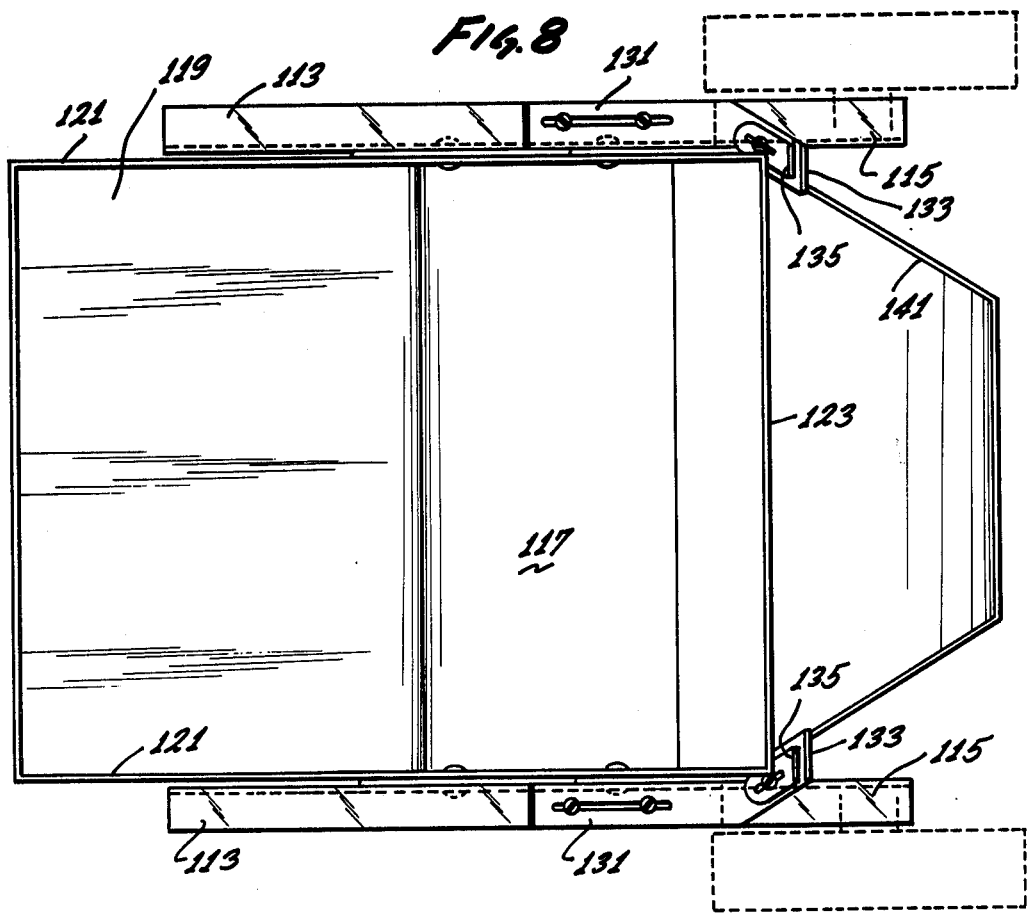
FIG. 8 comprises a top plan view of the device illustrated in FIG. 7.

Referring now to the embodiment of the present invention illustrated in FIGS. 7 and 8, there is shown a frame 111 supported by front legs 113 and rear legs 115. Mounted upon or integral with the frame 111 is a chute 117 comprising a front wall 119, side walls 121, and a rear wall 123. In the illustrated embodiment, the front wall 119 may be curved so as to direct vegetation to be shredded from the inlet end of the chute, which is illustrated as being directed substantially upwardly, to the outlet end which is also illustrated as being directed substantially upwardly. In other words, the direction of flow of vegetation within the chute 117 will be reversed approximately 180° so that it comes up under the rotary blade 124 of a rotary-type mower 125.

As shown in FIG. 7, the legs 115 may be provided with suitable adjustment devices 129 so that the angle of the outlet or exhaust end of the chute can be adjusted in accordance with the size of the mower 125.

In order to prevent movement of the mower relative to the chute, a bracket 131, terminating in a stop surface 133 may be mounted on each side of the frame 111, one form of bracket being shown in FIG. 10. An adjustable stop 135 may be suitably mounted on the bracket so that the stops 133 and 135 can capture the front end of the mower housing therebetween in a manner illustrated in FIG. 7. The bracket 131 may be moved backward or forward so that the outer tip of the blade 124 can be positioned over the exhaust end of the chute to shred vegetation as it comes out of the chute. Another form of bracket is shown in FIG. 11 in which the parts 131a, 133a, and 135a have the function of the parts 131, 133, and 135, respectfully of FIG. 10.

Ideally, the edge of the chute 141 across which the tip of the mower blade 124 moves as it rotates from a position over the chute outlet end will be angled, in a manner illustrated in FIG. 8, so that any material between the chute and the blade will be subjected to a scissors-like action between the blade and the chute edge 141 as the blade is rotating. If this expedient is utilized, of course, the shredding action will be improved.

It will quickly be realized by those skilled in the art that it would be very desirable to use the present invention with different size mowers. For this purpose, FIGS. 10 and 11 illustrate two different stop devices which can be utilized with the chute 117 so as to fix mowers having different widths to the chute. Consequently, the position of the mower may be adjusted in accordance with its width so as to allow the front wheels of the mower to extend beyond the sides of the chute outlet to accomplish the desired result. If the mower is so small that the forward portion of the chute outlet would be uncovered, the operator may, if desired, install a rearward extension of the chute plate 123, similar to that illustrated at 33 in the previously described embodiment, thereby preventing vegetation from being exhausted from the chute in front of the mower.

In utilizing the device of this embodiment, the operation will be substantially the same as that described with respect to the first embodiment. That is, the chute and frame may be suitably attached to one another, if they are not integral or permanently attached, and located at a convenient work sight. The lawnmower may then be mounted between the stops 133 and 135 on each side of the frame and its engine (not shown) started. Then, vegetation may be fed into the chute 117 for passage to the blade 123 for shredding and ultimate expulsion through the lanwmower exhaust opening into a grass catcher or other bagging device.

It will be noted that the front end of the housing 125 of the lawnmower may be preferably positioned over the forward portion of the leg 115. Many operators of rotary mowers start the engine of the mower by placing a foot on top of the housing in order to gain leverage when the starting cord is pulled. By locating the forward portion of the housing over the leg 115, sufficient support is provided to prevent the entire chute from tilting about the leg. In other words, sufficient stability can then be provided to prevent the forward portion of the lawnmower from being pushed toward the ground by the operator's leg, thereby preventing the possibility of danger.

In some cases, it may be desirable to employ the chute 117 with a lawnmower of the suction type. As is well known, such lawnmowers, as illustrated in FIG. 9, employ a blade 123a having a curved tip 175, which, in the manner of a fan, creates a suction about the periphery of the mower which will pull grass and other matter up to the blade for severing and, in the use in the present invention, shredding. In order to maintain this vacuum force to the greatest extent possible, a suitable sheet or platform-like structure 177 may be provided to extend from the rear of the chute outlet and frame 111 toward the rear end of the lawnmower as illustrated in FIG. 9. If desired, the rear portion of the plate 177 may be supported by a flexible or adjustable leg 179 so that the plate can be adjustably located near the bottom of the mower housing without interferring with the rotation of the blade 123a. It will be realized by those skilled in the art that when such a mower is employed with the structure illustrated in FIG. 9, the suction exerted by the blade upon the exhaust or outlet end of the chute 117 will serve to help draw the vegetation through the chute and toward the blade, thus more fully utilizing the vacuum-like characteristics of the lawnmower. Of course, a platform-like element 177 may be used, if desired, with any rotary type mower to ensure safety by reducing access to the blade. Also, the platform or some other device, such as that shown at 211, may be used to elevate the rear mower wheels in the case of a self-propelled rotary power mower.

It will now be realized by those skilled in the art that the present invention is novel in its simplicity and usefulness since it obviates the need for providing an engine to drive a machine which is limited to a single and occasional application. At the same time, the device can be inexpensively produced and will not require great storage space, thereby allowing it to be used by any landscape maintenance service or individual homeowner. Accordingly, the present invention totally solves the problem of providing a structure for shredding and comminuting organic materials very inexpensively. Those skilled in the art will now be aware that the invention can be utilized in a wide variety of structures and that those previously described are merely illustrative and do not define the scope of the invention.

I claim:

1. Apparatus for shredding vegetation comprising in combination
   a lawnmower,
   means for supporting said lawnmower and retaining it in a predetermined position including
      frame means and
      stop means mounted on said frame means for abutment with said lawnmower,
   means defining a chute including
      inlet means located so as to receive vegetation and other shreadable materials therein,
      outlet means located immediately adjacent to the cutting mechanism of said lawnmower, and
      means about said outlet means for confining the movement of vegetation to a flow path leading into the cutting mechanism of said lawnmower,
   means for maintaining the cutting blade of said lawnmower and the edges of said outlet means in substantially parallel relationship, and □ means in said outlet means for cooperation with the cutting blade of said lawnmower in a scissors-like action.

2. The apparatus of claim 1 wherein
   said supporting and retaining means comprise
      means for adjustably locating said lawnmower on said frame means.

3. The apparatus of claim 1 including
   means for adjusting said stop means in accordance with the size of said lawnmower so as to maintain said outlet means and the cutting blade of said lawnmower in a substantially parallel relationship.

4. The apparatus of claim 1 including
   means in said chute for altering the direction of flow of material therein approximately 90°.

5. The apparatus of claim 1 including
   means in said chute for altering the direction of flow of material therein approximately 180°.

6. A shredding apparatus comprising
   a chute means including
      an inlet located at a height convenient for the receipt of material to be shredded and
      an outlet located adjacent a means for supporting a lawnmower and
   means for supporting a lawnmower comprising
      frame means upon which a power lawnmower may be positioned such that the cutting blade thereof is located immediately adjacent said outlet and
      means for releasably locating the power lawnmower on said frame means,
   said chute means includes
      means located substantially parallel to the blade of a rotary lawnmower for cooperation therewith in a scissors-like action.

7. The apparatus of claim 6 including
   means for stabilizing said apparatus when an operator starts a lawnmower positioned thereon.

8. Apparatus for use in combination with a power lawnmower for shredding vegetation comprising
a frame,
means for locating and fixing said frame relative to horizontal surface
chute means mounting on said frame including
an inlet conveniently located for the insertion for shreddable vegetation there into and an outlet,
said outlet including an edge surface thereon which is so located relative to a lawnmower positioned on said frame as to cooperate with the blade thereof in a scissors-like shredding of vegetation there between, and
means on said frame for locating a power lawnmower on said frame such that the cutting blade thereof is positioned closely adjacent said outlet.

9. The apparatus of claim 8 wherein
said chute means includes
wall means so formed as to locate said outlet and said inlet at an approximately 90° relative angle to locate said outlet adjacent the position in which a power lawnmower of the reel-type may be located.

10. The apparatus of claim 8 wherein
said chute means includes
wall means so formed as to locate said outlet and said inlet at an approximately 180° relative angle to locate said outlet immediately below the forward portion of the position in which a power lawnmower of the rotary-type may be located.

11. The apparatus of claim 8 wherein
said frame means includes
panel means located thereon to enclose the undersurface of the lawnmower located on said frame, except at said outlet.

12. The apparatus of claim 8 including
means for elevating the rear wheels of a self-driven rotary mower.

* * * * *